United States Patent
Fitzgerald et al.

(10) Patent No.: US 8,010,810 B1
(45) Date of Patent: Aug. 30, 2011

(54) TECHNIQUES FOR PROTECTING DATA USING AN ELECTRONIC ENCRYPTION ENDPOINT DEVICE

(75) Inventors: John T. Fitzgerald, Mansfield, MA (US); Jack S. Harwood, Paxton, MA (US); Thomas E. Linnell, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 914 days.

(21) Appl. No.: 11/965,244

(22) Filed: Dec. 27, 2007

(51) Int. Cl.
*G06F 11/30* (2006.01)
*H04L 9/08* (2006.01)
*H04L 9/00* (2006.01)

(52) U.S. Cl. ........ 713/193; 380/273; 380/277; 380/278; 380/279; 380/267

(58) Field of Classification Search .................. 380/273, 380/277–279
See application file for complete search history.

(56) References Cited

U.S. PATENT DOCUMENTS

| | | |
|---|---|---|
| 6,178,505 B1 | 1/2001 | Schneider et al. |
| 6,785,728 B1 | 8/2004 | Schneider et al. |
| 6,971,016 B1 | 11/2005 | Barnett |
| 7,055,027 B1 | 5/2006 | Gunter et al. |
| 7,110,982 B2 | 9/2006 | Feldman et al. |
| 7,234,063 B1 | 6/2007 | Baugher et al. |
| 7,246,233 B2 | 7/2007 | Brabson et al. |
| 7,272,625 B1 | 9/2007 | Hannel et al. |
| 7,310,821 B2 | 12/2007 | Lee et al. |
| 7,353,388 B1 | 4/2008 | Gilman et al. |
| 7,725,765 B2 * | 5/2010 | Arakawa et al. .................. 714/6 |
| 2008/0126813 A1 * | 5/2008 | Kawakami ..................... 713/193 |

* cited by examiner

*Primary Examiner* — Philip Chea
(74) *Attorney, Agent, or Firm* — BainwoodHuang

(57) ABSTRACT

An electronic encryption endpoint device includes a management interface, a storage device interface and a controller. The management interface is capable of operating as a control interface (e.g., connecting to an array controller). The storage device interface is arranged to communicate with a set of storage devices. The controller is arranged to (i) receive a key encryption key through the management interface, (ii) decrypt a portion of a key table entry of a key table using the key encryption key to extract a data encryption key from the portion of the key table entry, the data encryption key being initially encrypted within the portion of the key table entry prior to decrypting the portion of the key table entry, and (iii) encrypt data using the data encryption key and store the encrypted data in the set of storage devices through the storage device interface.

25 Claims, 5 Drawing Sheets

TECHNIQUES FOR PROTECTING DATA USING AN ELECTRONIC ENCRYPTION ENDPOINT DEVICE

BACKGROUND

A conventional data storage system typically includes (i) a storage processor and (ii) a set of disk drives, e.g., a disk array enclosure (DAE) containing one or more disk drives. During operation, the storage processor carries out data storage operations on behalf of one or more external host devices. For example, when the storage processor receives a request from an external host device to write host data, the storage processor stores the host data on the set of disk drives (perhaps in accordance with a RAID level). Similarly, when the storage processor receives a request from an external host device to read host data, the storage processor loads the host data from the set of disk drives (unless the host data is already available in cache memory from an earlier operation) and provides the host data to the requesting host device.

Some data storage systems separate disk interfacing circuitry from other storage processor circuitry. For example, in one conventional data storage system having multiple storage processors, each storage processor communicates with (i) a first bank of DAEs through a first disk interface module, and (ii) a second bank of DAEs through a second disk interface module. Each disk interface module is configured to carry out a specific standardized storage device protocol such as SCSI (the Small Computer System Interface) or SATA (Serial ATA). In the event of a disk interface module failure, only the failed disk interface module needs to be replaced. That is, the storage processor circuitry can remain in place and can continue to carry out data storage operations through the non-failed disk interface module.

Some conventional data storage systems are further equipped with encryption keys to encrypt and decrypt communications exchanged between the data storage systems and the external host devices. This provides a level of security for communications along the routes between the data storage systems and the external host devices which, in some cases, may be over public networks.

Furthermore, host data can be encrypted prior to storage on the disk drives. For example, a host device can send encrypted host data (e.g., an encrypted file, an encrypted database transaction, etc.) to the data storage system, and the storage processors can then store the encrypted host data on the disk drives in the same manner as non-encrypted host data.

SUMMARY

Unfortunately, the above-described conventional data storage systems generally do not provide adequate data security for data at rest on the set of disk drives. Although the host data sent to the data storage system is capable of being encrypted (e.g., a user can manually encrypt a file, a database application can encrypt a database transaction, etc.), there is typically no encryption functionality offered by the conventional data storage systems themselves. Thus, someone with access to the disk drives will freely be able to read all of the non-encrypted data (e.g., suppose that the disk drives are discarded after the data storage system receives a disk drive upgrade).

Moreover, certain complexities arise if a storage processor is tasked with encrypting data en route to disk drives. In particular, for the storage processor to carry out encryption (and/or decryption), the storage processor must be able to use an encryption key. Unfortunately, if the encryption key is exposed for use on the storage processor, the encryption key also could be read by an intruder on the storage processor (e.g., a worm, a renegade application, a hacker, etc.). That is, the encryption key which is used to encrypt (and/or decrypt) the data would now be vulnerable, readable state and thus pose a potentially greater security threat if the storage processor is infiltrated.

In contrast to the above-described conventional data storage systems which lack encryption functionality and in contrast to a potential configuration which involves exposing an encryption key on a storage processor, an improved technique utilizes a data encryption key which works on an electronic encryption endpoint device (e.g., an I/O module interconnecting a storage processor and storage devices) but further allows the data encryption key to be handled in encrypted form in non-endpoint locations. Such a situation enables reliable encryption/decryption of data within the electronic encryption endpoint device using the data encryption key but also alleviates the need to expose the data encryption key in non-encrypted form at a vulnerable non-endpoint location (e.g., within a storage processor).

One embodiment is directed to an electronic encryption endpoint device which includes a management interface, a storage device interface and a controller which is interconnected between the management interface and the storage device interface. The management interface is capable of operating as a control or command interface (e.g., connecting to an array controller). The storage device interface is arranged to communicate with a set of storage devices. The controller is arranged to (i) receive a key encryption key (KEK) through the management interface, (ii) decrypt a portion of a key table entry of a key table using the KEK to extract a data encryption key (DEK) from the portion of the key table entry, the DEK being initially encrypted within the portion of the key table entry prior to decrypting the portion of the key table entry, and (iii) encrypt data using the DEK and store the encrypted data in the set of storage devices through the storage device interface. Such an embodiment provides a reliable key management system which securely protects the DEK until the DEK reaches the electronic encryption endpoint device, and enables the DEK to robustly and reliably secure data at rest.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

An improved technique utilizes a data encryption key which is usable within an electronic encryption endpoint device (e.g., an I/O module interconnected between a storage processor and storage devices) but further allows the data encryption key to be handled in encrypted and thus secure form in non-endpoint locations. Such a situation enables reliable encryption and/or decryption of data within the electronic encryption endpoint device using the data encryption key but also alleviates the need to expose the data encryption key in non-encrypted form at a potentially vulnerable non-endpoint location (e.g., within a storage processor).

Figure 1:
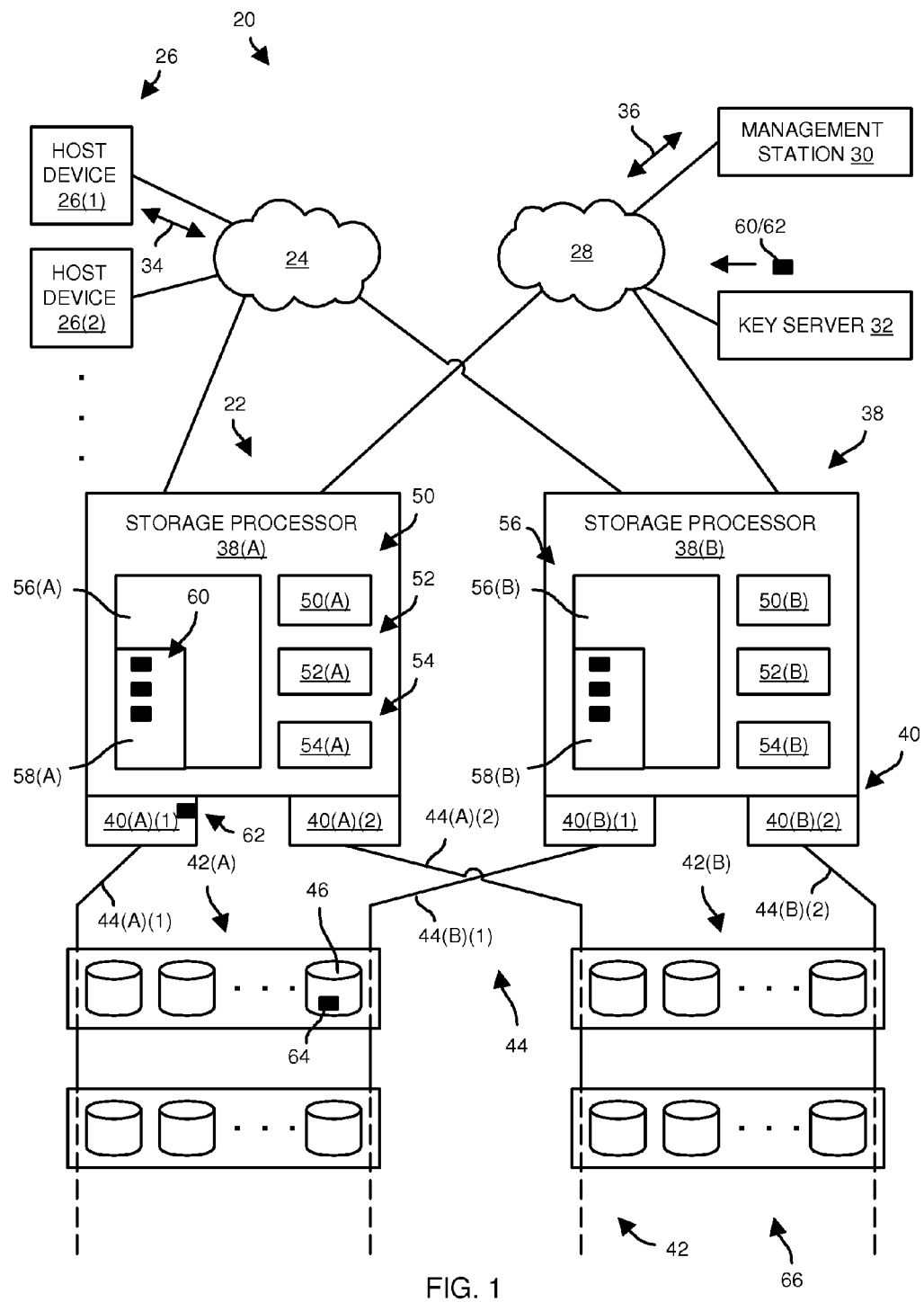
FIG. 1 is a block diagram of a data storage environment which utilizes a key management system which carries out reliable key management.

FIG. 1 is a block diagram of a data storage environment 20 which is capable of reliably and robustly managing host data using secure key management. The data storage environment 20 includes a data storage array 22, a storage area network (SAN) infrastructure 24, a set of host devices 26(1), 6(2), . . . (collectively, hosts 26), a computerized network 28 (e.g., a local area network), a management station 30, and a key server 32. The SAN infrastructure 24 connects the host devices 26 to the data storage array 22, and is configured to carry SAN-based communications 34 (e.g., block-based communications). Similarly, the computerized network 28 connects the management station 30 and the key server 32 to the data storage array 22, and is configured to carry LAN-based communications 36 (e.g., TCP/IP communications).

During operation, the data storage array 22 is arranged to perform a variety of data storage operations on behalf of the host devices 26 (e.g., to store and retrieve host data). The key server 32 operates as a secure repository for encryption keys (e.g., provides key generation, stores and tracks key allocation, etc.) which are utilized by the data storage array 22 to encrypt and decrypt data within the data storage array 22. The management station 30 operates as a controlling management entity for managing the configuration of the data storage array 22 (e.g., for managing its various storage devices), as well as monitoring and managing the normal operation and error conditions of the data storage array 22.

As shown in FIG. 1, the data storage array 22 includes storage processing devices 38(A), 38(B) (collectively, storage processing devices 38), I/O modules 40(A)(1), 40(A)(2), 40(B)(1), 40(B)(2) (collectively, I/O modules 40), storage device enclosures 42(A), 42(B) (collectively, storage device enclosures 42), and cables 44(A)(1), 44(A)(2), 44(B)(1), 44(B)(2) (collectively, cables 44). Each storage device enclosure 42 (e.g., a DAE) is capable of supporting multiple storage devices 46 (e.g., disk drives, flash memory drives, etc.).

Each I/O module 40 in combination with a cable 44 forms a pathway between a storage processing device 38 and storage device enclosures 42. For example, the I/O module 40(A)(1) and the cable 44(A)(1) form a pathway between the storage processing device 38(A) and the storage device enclosures 42(A). Additionally, the I/O module 40(A)(2) and the cable 44(A)(2) form a pathway between the storage processing device 38(A) and the other storage device enclosures 42(B). Similarly, the I/O module 40(B)(1) and the cable 44(B)(1) form a pathway between the storage processing device 38(B) and the storage device enclosures 42(A). Also, the I/O module 40(B)(2) and the cable 44(B)(2) form a pathway between the storage processing device 38(B) and the other storage device enclosures 42(B).

It will be explained in further detail shortly that the I/O modules 40 are arranged to operate as both interfaces to the storage devices 46, as well as encryption engines which encrypt data en route to the storage devices 46, and decrypt data read from the storage devices 46. In some arrangements, such encrypting and decrypting occurs on data which has already been RAID processed by the storage processing devices 38, i.e., the I/O modules 40 encrypt and decrypt RAID data. Although such "encryption/decryption below the RAID layer" prevents data recovery from the storage devices 46 using RAID unless the remaining RAID data is first decrypted, such processing enables reliable encryption protection of the data while the data is at rest in the storage processing devices 38.

As further shown in FIG. 1, each storage processing device 38 (e.g., an array controller, a storage processor, a storage director, etc.) of the data storage array 22 includes a data storage application 50, a key management client 52, a key management and encryption application 54, and primary memory 56 which stores a key table 58. In particular, the storage processing device 38(A) includes a data storage application 50(A), a key management client 52(A), a key management and encryption application 54(A), and primary memory 56(A) which stores (among other things) a key table 58(A). Likewise, the storage processing device 38(B) includes a data storage application 50(B), a key management client 52(B), a key management and encryption application 54(B), and primary memory 56(B) which stores a key table 58(B).

Within each storage processing device 38, the various components operate to form a data storage engine which stores and retrieves data on behalf of the host devices 26. The further details of each of the above-listed component will now be provided.

The primary memory 56 of each storage processing device 38 is arranged to hold software constructs requiring fast access such as operating system code and data structures, and cached host data (e.g., a read cache, a write cache, etc.). The key table 58 within the primary memory 56 is a data structure which is arranged to hold encrypted (or "wrapped") data encryption keys 60 which are provided by the key server 32 and accessible by the I/O modules 40. While these data encryption keys 60 are encrypted, they are unusable until they themselves are decrypted (or "unwrapped") by key encryption keys 62 which persistently reside in the I/O modules 40 (e.g., see the I/O module 40(A)(1)). Further details of the use of these encryption keys 60, 62 will be provided shortly.

The data storage application 50 of each storage processing device 38 is arranged to respond to requests from the host devices 26 (e.g., see the communications 34). In particular, the data storage application 50 is tasked with carrying out read operations, write operations, read-modify-write operations, and so on. Along these lines, the data storage application 50 is arranged to cache data within the primary memory 56 for optimization purposes (e.g., write-back caching, etc.), implement error checking and correction (e.g., a particular RAID level), and coordinate its operation with the data storage application 50 of the other storage processing device 38 for possible failover purposes among other things.

The key management client 52 of each storage processing device 38 is arranged to operate as a secure interface to the key server 32. In particular, the key management client 52 is responsible for establishing a protocol connection (e.g., a secure channel) between that storage processing device 38 and the key server 32. In this manner, an application such as the key management and encryption application 54 is capable of securely utilizing various services of the key server 32 (e.g., key generation, key copy storage, key invalidation, etc.).

The key management and encryption application 54 of each storage processing device 38 is arranged to link storage objects within the data storage array 22 with data encryption keys 60 from the key server 32. In particular, the key management and encryption application 54 is capable of designating particular storage-related items as storage objects within the data storage array 22. Such items may include physical disk drives, logical unit numbers (LUNs) distributed across physical disk drives, hypervolumes (i.e., a particular storage space on a particular physical disk drive), and so on. Once the key management and encryption application 54 designates an item as a storage object, the key management and encryption application 54 obtains a data encryption key 60 from the key server 32 through the key management client 52 and links the obtained data encryption key 60 to that storage object. The key management and encryption application 54 then stores the data encryption key 60 in the key table 58 and manages the object/key association. As mentioned earlier, while the data encryption key 60 travels from the key server 32 to the storage processing device 38 and while the data encryption key 60 is handled within the storage processing device 38, the data encryption key 60 is in encrypted form (i.e., "wrapped") and is thus unusable even if the storage processing device 38 is infiltrated and the encrypted data encryption key 60 is acquired in an unauthorized manner.

Another operation of the key management and encryption application 54 involves providing the wrapped data encryption keys 60 to the I/O modules 40 upon request. As will be explained in further detail shortly, the I/O modules 40 have the ability to decrypt (i.e., "unwrap") the wrapped data encryption keys 60 for use in either encrypting data prior to writing the data to out to the storage devices 46, or decrypting data read from the storage devices 46.

At this point, it should be understood that the key server 32, in combination with the data storage array 22, form a reliable and secure key management system 66. In particular, the data encryption keys 60 remain unexposed and thus secure as they travel from the key server 32 (where they are generated) through the computerized network 28 and the storage processing devices 38 to the I/O modules 40 (where they are used for encryption and decryption). Accordingly, even though the secure channels provided from the key server 32 to the storage processing devices 38 terminate at the key management clients 52, this key management system 66 provides secure key delivery to encryption endpoints (e.g., the I/O modules 40) in the context of data storage applications. That is, there is a reliable end-to-end key protection mechanism in place, and any unauthorized access of the data encryption keys 60 within the storage processing devices 38 will, in the worst of cases, only provide data encryption keys 60 which are encrypted and thus unusable.

In some arrangements, each I/O module 40 persistently stores a globally unique key encryption key 62 in unwrapped, usable form. For example, the I/O module 40(A)(1) stores a first unwrapped key encryption key 62, the I/O module 40(A)(2) stores a different unwrapped key encryption key 62, and so on. In these arrangements, each I/O module 40 will not be able to unwrap all of the wrapped data encryption keys 60 in the key tables 58. Rather, the I/O module 40(A)(1) will only be able to unwrap a subset of the wrapped data encryption keys 60 using its key encryption key 62. Similarly, the I/O module 40(A)(2) will only be able to unwrap a different subset of the wrapped data encryption keys 60 using its key encryption key 62, and so on. Such arrangements thus provide an additional level of security. Further details will now be provided with reference to FIG. 2.

Secure Data Encryption Key Delivery to Endpoint Devices

Figure 2:
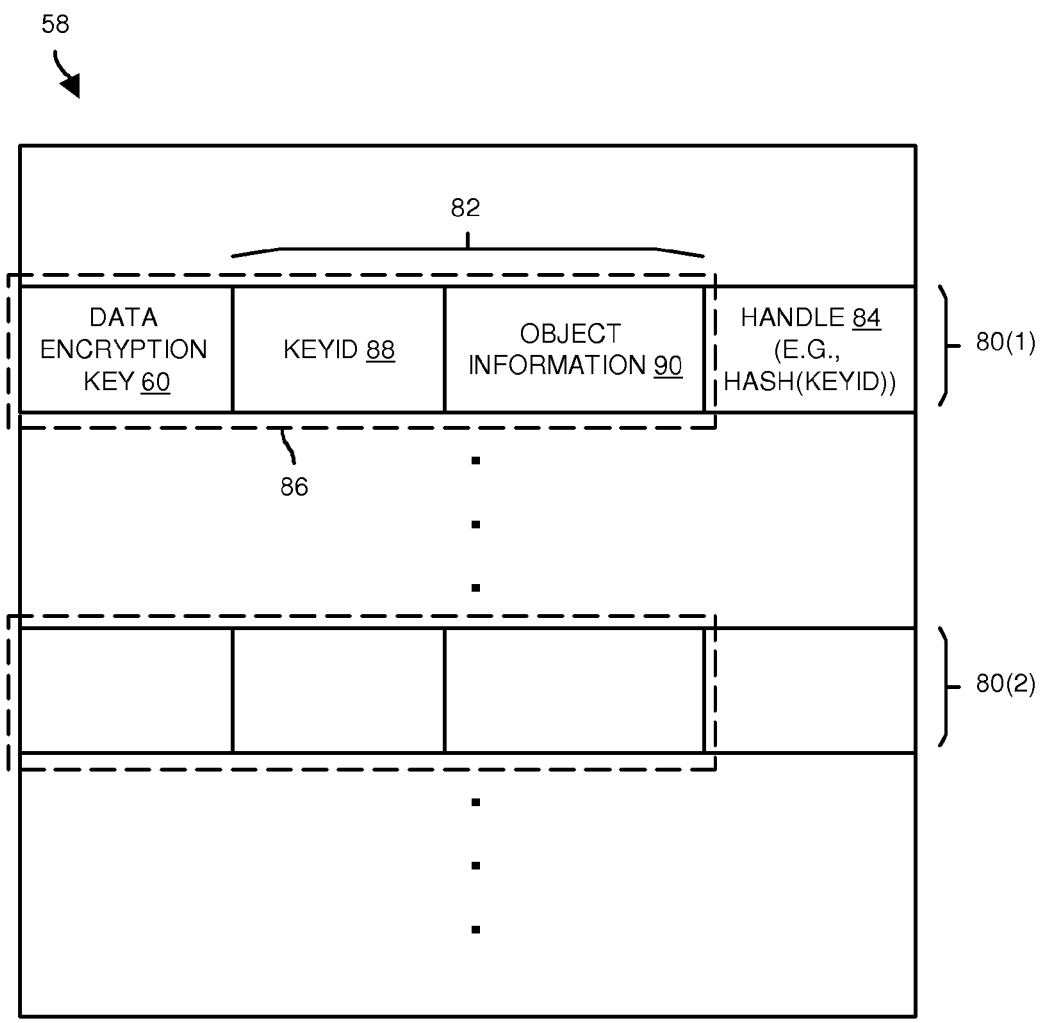
FIG. 2 is a block diagram of a key table which resides within a storage processing device of the data storage array of the data storage environment of FIG. 1.

FIG. 2 is a block diagram of a key table 58 which resides within the global memory 56 of a storage processing device 38. The key table 58 includes multiple key table entries 80(1), 80(2), . . . (collectively, key table entries 80). Each key table entry 80 includes a data encryption key 60, additional information 82 (e.g., metadata for integrity checking), and a handle 84.

The data encryption key 60 and the additional information 82 of each entry 80 are wrapped (i.e., encrypted) thus preventing key use until unwrapped. This wrapped feature 86 is illustrated by the dashed lines around the data encryption key 60 and the additional information 82 of each entry 80. As shown in FIG. 2, the additional information 82 includes a key identifier or index (KEYID) 88 and object information 90. The key identifier 88 uniquely identifies a particular storage object (e.g., a physical disk drive, a LUN, a hypervolume, etc.) linked to the data encryption key 60 within that key entry 80. The object information 90 includes supplemental information (e.g., storage object attributes, key policy information, etc.).

In some arrangements, storage object attributes within the object information 90 include particular characteristics of the associated storage object (e.g., a device number, a start address, an ending address, etc.). Additionally, in some arrangements, key policy information within the object information 90 includes particular encryption and/or key policy aspects (e.g., algorithm, mode, key length, a time to live value, etc.). Other types of information are capable of being included in the object information 90 as well.

The handle 84 of each entry 80 is unwrapped and acts as a unique reference to distinguish the key table entries 80 from each other. Accordingly, an application such as the key management and encryption application 54 is capable of conveniently indexing the entries 80 using the handles 84. In some arrangements, the handle 84 of each key table entry 80 is a hash of the key identifier 88 of that entry 80. Further details will now be provided with reference to FIG. 3.

Figure 3:
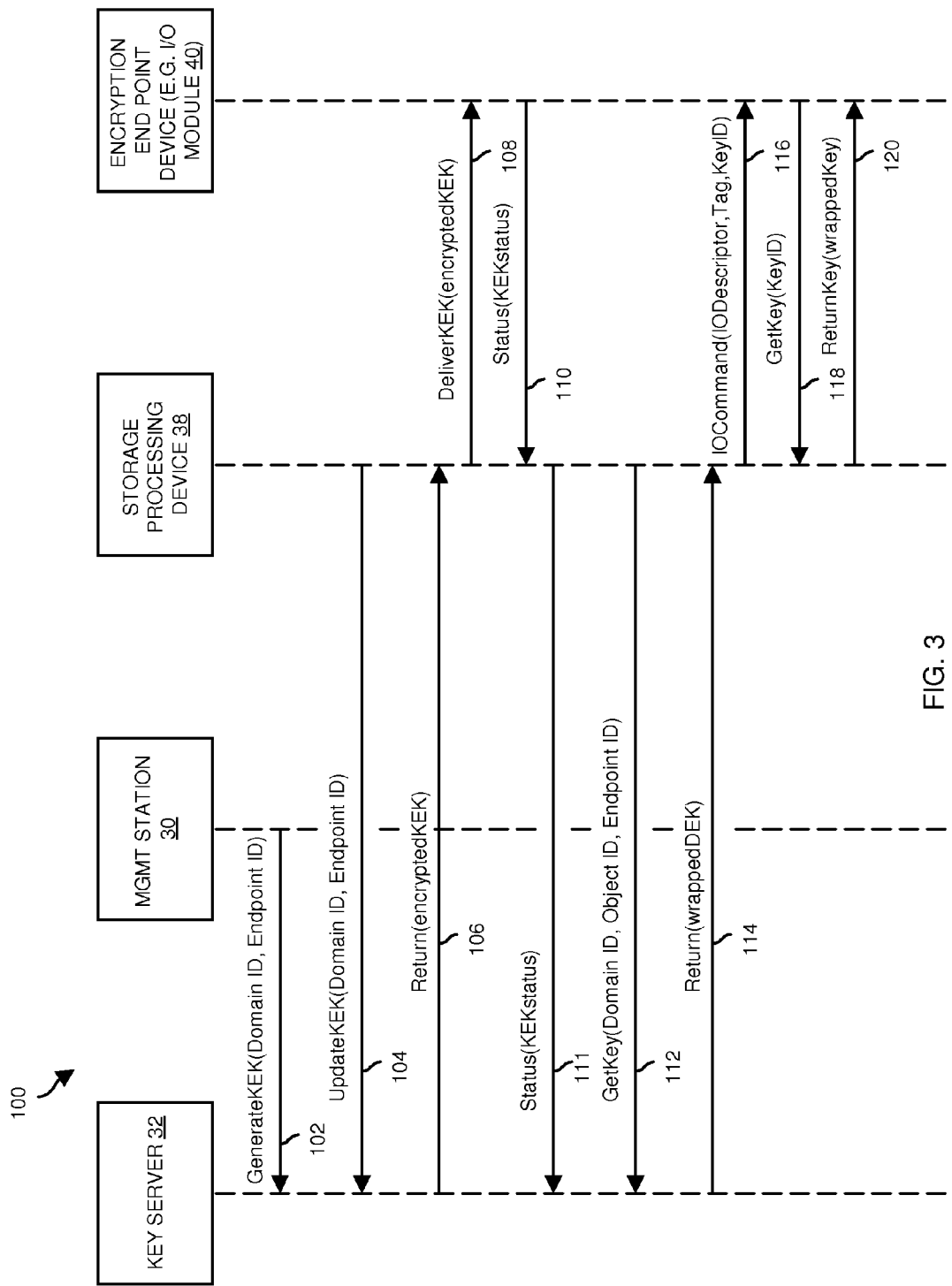
FIG. 3 is a sequence diagram illustrating secure data encryption key delivery from a key server to an encryption endpoint within the data storage environment of FIG. 1.

FIG. 3 is a sequence diagram 100 illustrating secure delivery of a data encryption key 60 from the key server 32 to an encryption endpoint device (e.g., an I/O module 40) within the data storage environment 20 (also see FIG. 1). At the outset, the key server 32 stores an entry having a domain ID which identifies the data storage array 22 and an endpoint ID which identifies an encryption endpoint. The key server 32 generates an initial encryption key (IEK), and maps this initial encryption key (IEK) to the entry thus storing the encryption endpoint relationship, i.e., an association between a particular encryption key and an encryption endpoint. Additionally, this initial encryption key (IEK) is preloaded and persistently stored within an actual encryption endpoint device (e.g., an I/O module 40 in FIG. 1).

At this point, the storage processing device 38 is well-equipped to interact with the key server 32. In particular, the key table 58 resides in the primary memory 56 and is under control of the key management and encryption application 54. Also, the key management client 52 provides a reliable and protected interface in the form of a secure channel through which the key management and encryption application 54 can carry out key management tasks with the key server 32.

Details of how the various components operate to securely deliver a key encryption key (KEK) to replace the preloaded initial encryption key (IEK) will now be provided. As shown in FIG. 3, the management station 30 (FIG. 1) directs the key server 32 to create a globally unique key encryption key 62 for use by the encryption endpoint. In particular, the management station 30 provides a key generation command 102 (GenerateKEK( ) which includes the domain ID identifying the data storage array 22 and the endpoint ID identifying the particular encryption endpoint. In response, the key server 32 generates a key encryption key (KEK) and is ready to associate that generated key encryption key (KEK) with the domain ID and the endpoint ID upon proper acknowledgement from the encryption endpoint. That is, the key server 32 is now ready to update/replace the initial encryption key (IEK) with the newly generated key encryption key (KEK) in its records once the key server 32 confirms that the encryption endpoint has correctly received the newly generated key encryption key (KEK).

Next, the storage processing device 38 directs the key server 32 to provide the generated key encryption key (KEK) to the storage processing device 38 for conveyance to the encryption endpoint. In particular, the storage processing device 38 provides a KEK update command 104 (UpdateKEK( ) which includes the domain ID and the endpoint ID.

In response to the key update command 104, the key server 32 retrieves both the particular generated key encryption key (KEK) and the initial encryption key (IEK) both of which are ready to be linked to the domain ID and the endpoint ID by the key server 32. The key server 32 then encrypts the generated key encryption key (KEK) using the initial encryption key (IEK) and provides a message 106 with the encrypted key encryption key (KEK) to the storage processing device 38 for conveyance to the encryption endpoint. While the generated key encryption key (KEK) is encrypted by the initial encryption key (IEK), the generated key encryption key (KEK) is secure against any proxies that are capable of reading the message 106 along the way to the encryption endpoint (e.g., an unauthorized infiltrater on the storage processing device 38).

The key management and encryption application 54 then delivers the encrypted key encryption key (KEK) to the encryption endpoint via a delivery command 108 (DeliverKEK(KEK)). Upon receipt of the encrypted key encryption key (KEK), the encryption endpoint (e.g., the I/O module 40 identified by the Endpoint ID) decrypts the KEK using the initial encryption key (IEK), validates or confirms that the decrypted KEK is in proper form, and returns status 110 (Status(KEKstatus)) to the storage processing device 38. If the encryption endpoint deems the KEK to be valid, the encryption endpoint replaces (e.g., overwrites) the initial encryption key (IEK) with the decrypted key encryption key (KEK) generated by the key server 32.

As shown by the message 111 from the storage processing device 38 to the key server 32, the storage processing device 38 provides confirmation/validation to the key server 32 indicating that the initial encryption key (IEK) has been properly replaced with the decrypted key encryption key (KEK) at the encryption endpoint and the key server 32. The key server 32 responds by committing the association of the key encryption key (KEK) with the encryption endpoint. That is, the key server 32 formally updates the initial encryption key (IEK) entry with the key encryption key (KEK). As a result, the key server 32 now understands that the encryption endpoint is using the key encryption key (KEK).

At this point, the encryption endpoint persistently possesses a non-encrypted key encryption key (KEK) which is globally unique. The encryption endpoint is thus ready to receive wrapped data encryption keys (DEK) for use in securely encrypting and storing data. Since the key encryption key (KEK) is globally unique, no other encryption endpoint will be able to properly unwrap and use the same encrypted data encryption keys (DEKs).

As further shown in FIG. 3, suppose that the key management and encryption application 54 is now tasked with configuring a new storage object on the set of storage devices 46. The key management and encryption application 54 associates an object ID with the storage object, and sends a command 112 containing the domain ID, the object ID, and the Endpoint ID, to the key server 32 to obtain a data encryption key (DEK) for the storage object.

In response to the command 112, the key server 32 retrieves the particular key encryption key (KEK) for the domain and encryption endpoint based on the domain ID and the endpoint ID. The key server 32 then generates a data encryption key (DEK) for the particular object ID, and wraps the generated data encryption key (DEK) along with other information using the key encryption key (KEK). This wrapped material preferably includes additional information 82 as well as the data encryption key (DEK) (also see the format for the wrapped portion 86 of the key table entry 80 in FIG. 2). While the wrapped material containing the data encryption key (DEK) is encrypted by the key encryption key (KEK), the data encryption key (DEK) is secure against any proxies that are capable of reading the wrapped material along its way to the encryption endpoint (e.g., the data encryption key (DEK) is protected against an unauthorized infiltrater on the storage processing device 38). Additionally, it should be understood that the key server 32 does not need to know anything about the object ID associated with the data encryption key (DEK), but needs only to link the object ID (e.g., a number) to the data encryption key (DEK) in order to track the object/key association.

Upon receipt of the message 114, the key management and encryption application 54 stores the wrapped material in a key entry 80 of the key table 58 (also see FIG. 2). Since the data encryption key (DEK) is wrapped, the data encryption key (DEK) remains secure while in the storage processing device 38. Nevertheless, the key management and encryption application 54 is able to robustly and reliably retrieve and manage the key table entry 80 containing the wrapped data encryption key (DEK) using the exposed handle 84 of the key entry 80 as an index.

Once the wrapped data encryption key (DEK) is available in the storage processing device 38, the storage processing device 38 is able to securely store data in the storage object on the storage devices 46 through the encryption endpoint (e.g., an I/O module 40). For example, the storage processing device 38 in combination with the I/O module 40 is now able to process host write instructions from the host devices 26 by encrypting and writing host data to the set of storage devices 46. To this end, the data storage application 50 sends an I/O command 116 directing the encryption endpoint to encrypt and store particular data in a particular storage object. As shown in FIG. 3, the I/O command 116 includes, among other things, a key identifier which identifies the particular storage object to store the data.

Since the encryption endpoint does not yet have the data encryption key (DEK), the encryption endpoint provides a command 118 containing the key identifier to the key management and encryption application 54 requesting the data encryption key (DEK). The key management and encryption application 54 retrieves at least the wrapped portion 86 of the key table entry 80 containing the wrapped data encryption key (DEK) based on the key identifier, and provides a message 120 with the wrapped portion 86 back to the encryption endpoint. As mentioned earlier, the key management and encryption application 54 is capable of applying a hash function to the key identifier to distinguish the key table entry 80 from other key table entries 80 (i.e., each key table entry 80 has a unique key identifier handle 84), and thus find the key table entry 80 with the correct data encryption key (DEK) wrapped with the correct key encryption key for proper use by the particular encryption endpoint.

Upon receipt, the encryption endpoint then unwraps the portion 86 using the key encryption key (KEK) to expose and extract the data encryption key (DEK) within the encryption endpoint. The encryption endpoint then encrypts the data using the exposed data encryption key (DEK) and then writes the encrypted data to the storage object.

The encryption endpoint is capable of caching recently used data encryption keys to reduce key delivery operations. For example, if the stored data needs to be accessed from the storage object at a later time and the data encryption key (DEK) remains cached within the encryption endpoint, the encryption endpoint is able to decrypt the data without the need to re-request the data encryption key (DEK) from the storage processing device 38.

Based on the above-provided description, it should be understood that the data encryption key (DEK) remains in wrapped form while handled within the storage processing device 38. Thus, the only time the data encryption key (DEK) is exposed after leaving the key server 32 is at the encryption endpoint, i.e., where is it used in an encryption engine. Accordingly, the above-described sequence achieves secure data encryption key delivery to the encryption endpoint.

At this point, it should be understood that each I/O module 40 of the data storage array 22 is configured to operate as an encryption engine. Additionally, each I/O module 40 preferably enjoys use of a persistently stored, globally unique key encryption key 62 (also see FIG. 1). As such, to provide multiple I/O modules 40 with the ability to use the same data encryption key 60, the key server 32 wraps the data encryption key 60 with a first globally unique key encryption key (KEK) for use only by one I/O module 40. The key server 32 additionally, wraps the data encryption key 60 with a second globally unique key encryption key (KEK) for use only by that second I/O module 40, and so on. Accordingly, the key table 58 may include multiple key table entries 80 containing the same wrapped data encryption key (DEK) with each entry 80 being capable of being unwrapped by only one I/O module 40 for enhanced security.

I/O Module As Encryption Endpoint

Figure 4:
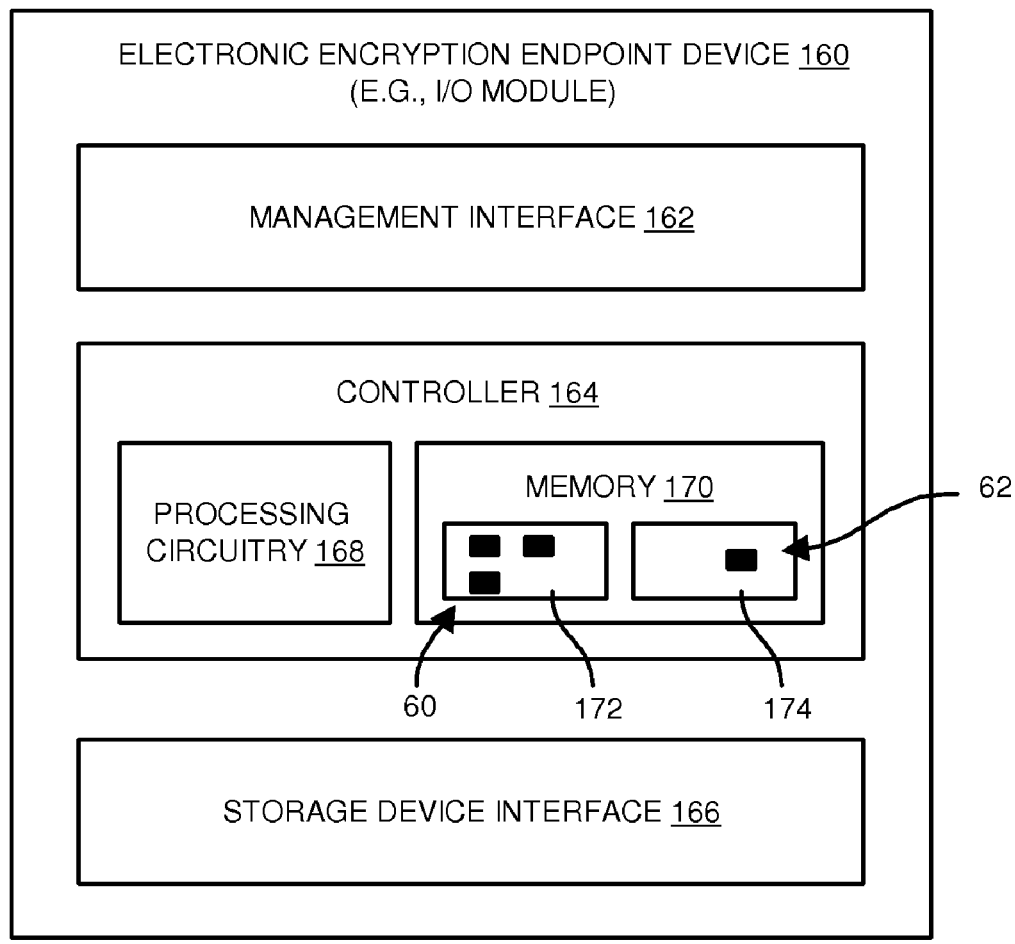
FIG. 4 is a block diagram of an electronic encryption endpoint device of the data storage environment of FIG. 1.

FIG. 4 shows particular details of an electronic encryption endpoint device 160. Such a device 160 is well-suited for an application that requires secure key delivery to an endpoint location through one or more proxies. For example, in the above-described data storage array 22, such a device 160 is well-suited for operating as an I/O module 40 thus enabling secure key delivery from the key server 32 through the storage processing device 38. In particular, even though a secure protocol communications channel may extend only from the key server 32 to the key management client 52, encryption of the encryption keys 60, 62 from the key server 32 maintains protection of the encryption keys 60, 62 until the encryption keys 60, 62 reach the encryption endpoint where the encryption keys 60, 62 are then put to use.

As shown in FIG. 4, the encryption endpoint device 160 includes a management interface 162, a controller 164, and a storage device interface 166. The management interface 162 is arranged to convey management communications between the controller 164 and another device (e.g., a storage processing device 38, also see FIG. 1). The storage device interface 166 is arranged to convey specific storage protocol communications between the controller 164 and a set of storage devices 46 (e.g., SCSI communications, SATA communications, etc., also see FIG. 1). The controller 164 is arranged to maintain secure key delivery to the encryption endpoint device 160 (e.g., to receive and decrypt wrapped data encryption keys), and operate as an encryption engine utilizing the keys (e.g., to use the unwrapped data encryption keys to encrypt and decrypt data).

As further shown in FIG. 4, the controller 164 includes processing circuitry 168 and memory 170. The memory 170 includes volatile memory 172 and non-volatile memory 174. The volatile memory 172 provides fast access and serves as a cache (e.g., caches keys, buffers data during processing, etc.). The non-volatile memory 174 persistently stores the key encryption key (KEK) 62 which is used to unwrap the encrypted data encryption keys (DEKs) 60 obtained from the storage processing device 38. Recall that the key management and encryption application 54 provides the wrapped portions 82 of the key table entries 80 to the I/O modules 40 when the I/O modules 40 are in need of appropriate data encryption keys (DEKs) 60 to either encrypt data en route to the storage devices 46, or decrypt data read from the storage devices 46. For optimization purposes, the volatile memory 172 is further capable of caching recently used data encryption keys (DEKs) 60 in the event the data encryption keys (DEKs) 60 are needed again shortly thereafter (see FIG. 4). Further details will now be provided with reference to FIG. 5.

Figure 5:
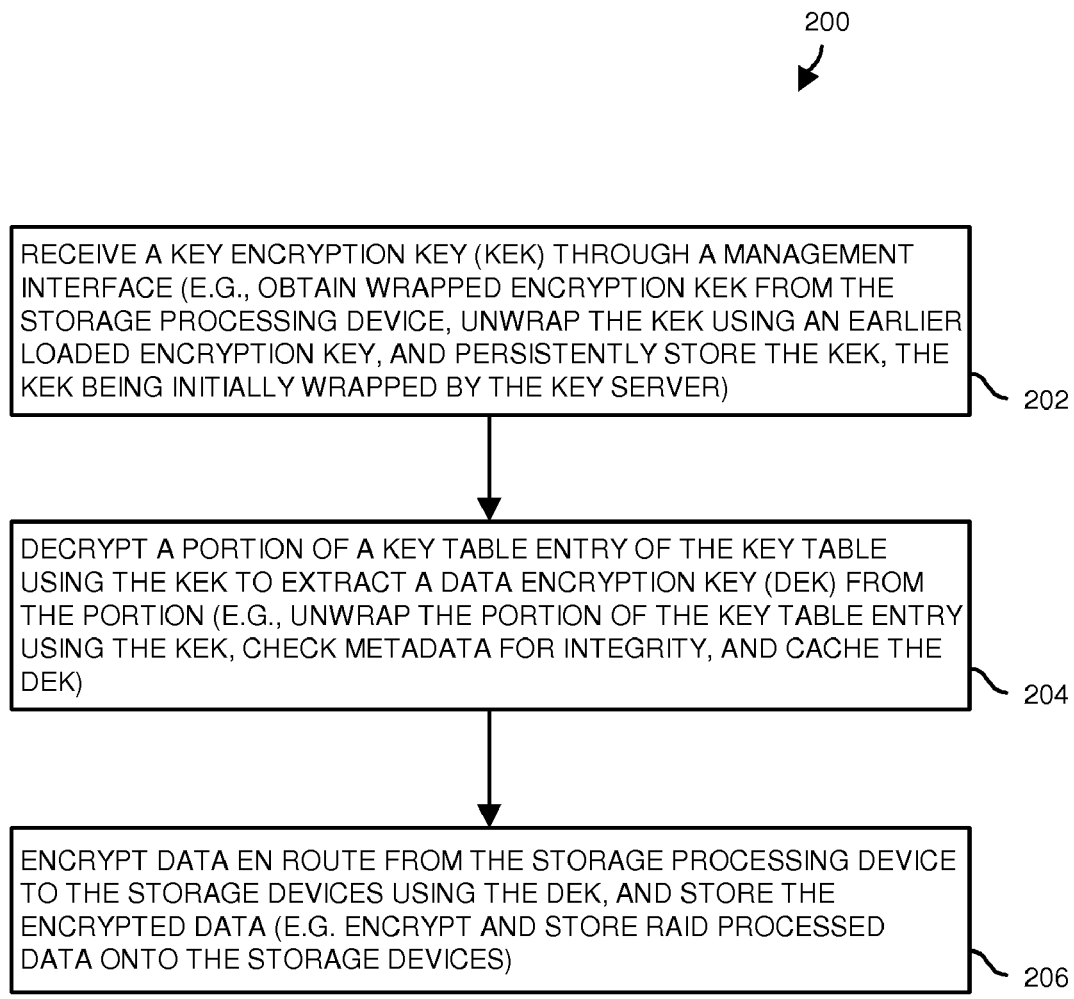
FIG. 5 is a flowchart of a procedure which is performed by the electronic encryption endpoint device of FIG. 4.

FIG. 5 is a flowchart of a procedure 200 which is performed by the processing circuitry 168 of the electronic encryption endpoint device 160. In step 202, the processing circuitry 168 receives a key encryption key (KEK) through the management interface 162 (FIG. 4). For example, as described above in connection with FIG. 3, a wrapped key encryption key (KEK) passes from the key server 32 to the encryption endpoint through the storage processing device 38 (see signals 104, 106 and 108 in FIG. 3). In this example, the material sent from the storage processing device 38 to the encryption endpoint has a format similar to that of the portion 86 of a key table entry 80 (also see FIG. 2) and the processing circuitry 168 unwraps the encrypted key encryption key (KEK) using a preloaded initial encryption key (IEK).

In step 204, the processing circuitry 168 obtains a portion 86 of a key table entry 80 having a wrapped data encryption key (DEK) 60 (e.g., see reference number 86 in FIG. 2). The processing circuitry 168 then decrypts the portion 86 of the key table entry 80 using the key encryption key (KEK) 62 to extract the data encryption key (DEK) 60 which to this point had been safely encrypted. At this same time, at least some of the additional information 82 (e.g., metadata such as the object information 90) within the portion 86 can be analyzed for integrity checking purposes. Based on the above, acquisition of the data encryption key (DEK) occurs in a secure manner. The data encryption key (DEK) 60 is now available for use within the encryption endpoint device 160 for data encryption/decryption purposes.

In step 206, the processing circuitry 168 encrypts data en route to the storage devices 46. In particular, the processing circuitry 168 encrypts data from the storage processor device 38 using the data encryption key (DEK) and stores the encrypted data in the set of storage devices 46 through the storage device interface 166. As a result, delivery of the data encryption key (DEK) 60 to the encryption endpoint device 160 occurs in a protected manner, and data is then reliably encrypted and decrypted within the encryption endpoint device 160 using the securely delivered data encryption key (DEK) 60.

It should be understood that the procedure 200 is capable of being repeated so that the encryption endpoint uses new key encryption keys (KEKs) over time. Such retiring or old key encryption keys (KEKs) in favor of new key encryption keys (KEKs) provides further security. Along these lines, such updating of the key encryption key (KEK) is capable of being carried out periodically, in response to events (e.g., update requests), or combinations thereof.

In some arrangements, encryption of the data (e.g., host data, data used by the array, etc.) occurs after application of a RAID level scheme, i.e., data encryption occurs below the RAID layer. Such arrangements enable robust data recovery to occur after the remaining data has been read from the storage devices 46 and decrypted.

CONCLUSION

As described above, an improved technique utilizes a data encryption key (DEK) 60 which is usable in within an electronic encryption endpoint device 160 (e.g., an I/O module 40 interconnected between a storage processor 38 and storage devices 46) but further allows the data encryption key (DEK) 60 to be handled in encrypted and thus secure form in non-endpoint locations (e.g., within a storage processor 38). Such a situation enables reliable encryption and/or decryption of data within the electronic encryption endpoint device 160 using the data encryption key (DEK) 60 but also alleviates the need to expose the data encryption key (DEK) 60 in non-encrypted form at a potentially vulnerable non-endpoint location (e.g., within a storage processor 38).

While various embodiments of the invention have been particularly shown and described, it will be understood by those skilled in the art that various changes in form and details may be made therein without departing from the spirit and scope of the invention as defined by the appended claims.

For example, the I/O modules 40 were described above as using globally unique key encryption keys (KEKs) for additional security. In alternative arrangements, the I/O modules 40 can use the same key encryption key (KEK). Such arrangements would decrease the size of the key table 58 and enable a particular key table entry 80 to be used by multiple I/O modules 40 but also expose the commonly used key encryption key (KEK) on multiple I/O modules 40.

Additionally, the I/O modules 40 were described by way of example only as being the encryption endpoints which are involved in secure encryption key delivery. It should be understood that other components of the data storage array 22 are suitable for use as the encryption endpoints as well. For instance, in some arrangements, the storage device enclosures 42 (FIG. 1) operate as encryption endpoints thus placing the encryption endpoints closer to the storage devices 46. In other arrangements, the storage devices 46 themselves operate as the encryption endpoints. In a basic context (i.e., not necessarily in a data storage array), the encryption endpoints are devices which have a need for secure key delivery along a pathway that may be vulnerable to infiltration. Such modifications, enhancements and implementations which have smart devices operating as encryption endpoints are intended to belong to various embodiments of the invention.

Furthermore it should be noted that any of various encryption/decryption processes may be employed, including the various modes of the Advanced Encryption Standard (AES), and using keys of various sizes. Such details of encryption/decryption itself are outside the scope of the present description which is more concerned with certain aspects of the distribution and use of the encryption keys which are used by the data storage arrays in the encryption and decryption processes.

What is claimed is:

1. A data storage array, comprising:
a storage processor device;
a set of storage devices; and
an electronic encryption endpoint device having (i) a management interface coupled to the storage processor device, (ii) a storage device interface coupled to the set of storage devices, and (iii) a controller interconnected between the management interface and the storage device interface, the controller being arranged to:
receive a key encryption key through the management interface,
decrypt a portion of a key table entry of a key table using the key encryption key to extract a data encryption key from the portion of the key table entry, the data encryption key being initially encrypted within the portion of the key table entry prior to decrypting the key table entry, and
encrypt data from the storage processor device using the data encryption key and store the encrypted data in the set of storage devices through the storage device interface.

2. A data storage array as in claim 1 wherein the key table is disposed within the storage processor device; and wherein the controller of the electronic encryption endpoint device, when decrypting the portion of the key table entry of the key table using the key encryption key to extract the data encryption key from the portion of the key table entry, is arranged to:
receive the portion of the key table entry from the storage processor device through the management interface while the data encryption key remains encrypted within the portion of the key table entry, and
apply the key encryption key to the portion of the key table entry to obtain the data encryption key in non-encrypted form within the electronic encryption endpoint device.

3. A data storage array as in claim 2 wherein the portion of the key table entry originates from a key server; and wherein the controller of the electronic encryption endpoint device, when receiving the portion of the key table entry from the storage processor device while the data encryption key remains encrypted within the portion of the key table entry, is arranged to:
acquire the portion of the key table entry with the data encryption key having been preserved in encrypted form until the portion of the key table entry reaches the electronic encryption endpoint device to provide a secure pathway for the data encryption key from the key server to the electronic encryption endpoint device through the storage processor device.

4. A data storage array as in claim 2 wherein the electronic encryption endpoint device is an input/output (I/O) module which is interconnected between the storage processor device and the set of storage devices; wherein the storage processor device is arranged to process data storage operations from an external host device; and wherein the controller of the electronic encryption endpoint device, when encrypting the data using the data encryption key and storing the encrypted data in the set of storage devices, is arranged to:
in response to a host write instruction provided from the external host device, (i) encrypt host data provided by the external host device and (ii) write the encrypted host data from the I/O module to the set of storage devices.

5. An electronic encryption endpoint device, comprising:
a management interface;
a storage device interface arranged to communicate with a set of storage devices; and a controller interconnected between the management interface and the storage device interface, the controller being arranged to:
  receive a key encryption key through the management interface,
  decrypt a portion of a key table entry of a key table using the key encryption key to extract a data encryption key from the portion of the key table entry, the data encryption key being initially encrypted within the portion of the key table entry prior to decrypting the key table entry, and
  encrypt the data using the data encryption key and store the encrypted data in the set of storage devices through the storage device interface.

6. An electronic encryption endpoint device as in claim 5 wherein the key table is disposed within a storage processor device; wherein the management interface is arranged to communicate with the storage processor device; and wherein the controller, when decrypting the portion of the key table entry of the key table using the key encryption key to extract the data encryption key from the portion of the key table entry, is arranged to:
  receive the portion of the key table entry from the storage processor device through the management interface while the data encryption key remains encrypted within the portion of the key table entry, and
  apply the key encryption key to the portion of the key table entry to obtain the data encryption key in non-encrypted form within the electronic encryption endpoint device.

7. An electronic encryption endpoint device as in claim 6 wherein the portion of the key table entry originates from a key server; and wherein the controller, when receiving the portion of the key table entry from the storage processor device while the data encryption key remains encrypted within the portion of the key table entry, is arranged to:
  acquire the portion of the key table entry with the data encryption key having been preserved in encrypted form until the portion of the key table entry reaches the electronic encryption endpoint device to provide a secure pathway for the data encryption key from the key server to the electronic encryption endpoint device through the storage processor device.

8. An electronic encryption endpoint device as in claim 6 wherein the electronic encryption endpoint device is an input/output (I/O) module which is interconnected between the storage processor device and the set of storage devices; and wherein the controller, when encrypting the data using the data encryption key and storing the encrypted data in the set of storage devices, is arranged to:
  in response to a host write instruction provided from an external host device, (i) encrypt host data provided by the external host device and (ii) write the encrypted host data from the I/O module to the set of storage devices.

9. A method of protecting data, the method comprising:
  at an electronic encryption endpoint device, receiving a key encryption key;
  at the electronic encryption endpoint device, decrypting a portion of a key table entry of a key table using the key encryption key to extract a data encryption key from the portion of the key table entry, the data encryption key being initially encrypted within the portion of the key table entry prior to decrypting the key table entry; and
  at the electronic encryption endpoint device, encrypting the data using the data encryption key and storing the encrypted data in a set of storage devices.

10. A method as in claim 9 wherein the key table resides within a storage processor device coupled to the electronic encryption endpoint device; and wherein decrypting the portion of the key table entry of the key table using the key encryption key to extract the data encryption key from the key table entry includes:
  receiving the portion of the key table entry from the storage processor device while the data encryption key remains encrypted within the portion of the key table entry, and
  applying the key encryption key to the portion of the key table entry to obtain the data encryption key in non-encrypted form within the electronic encryption endpoint device.

11. A method as in claim 10 wherein the portion of the key table entry originates from a key server; and wherein receiving the portion of the key table entry from the storage processor device while the data encryption key remains encrypted within the key table entry includes:
  acquiring the portion of the key table entry with the data encryption key having been preserved in encrypted form until the portion of the key table entry reaches the electronic encryption endpoint device to provide a secure pathway for the data encryption key from the key server to the electronic encryption endpoint device through the storage processor device.

12. A method as in claim 10 wherein the electronic encryption endpoint device is an input/output (I/O) module which is interconnected between the storage processor device and the set of storage devices; and wherein encrypting the data using the data encryption key and storing the encrypted data in the set of storage devices includes:
  in response to a host write instruction from an external host device, (i) encrypting host data provided by the external host device and (ii) writing the encrypted host data from the I/O module to the set of storage devices.

13. A method as in claim 12 wherein the set of storage devices include physical disk drive devices; wherein key table entries of the key table contain data encryption keys corresponding to the physical disk drive devices; and wherein writing the encrypted host data from the I/O module to the set of storage devices includes:
  storing the host data to a particular physical disk drive device corresponding to the data encryption key used to encrypt the data.

14. A method as in claim 12 wherein the set of storage devices include physical disk drive devices; wherein key table entries of the key table contain data encryption keys corresponding to logical unit numbers mapped across the physical disk drive devices; and wherein writing the encrypted host data from the I/O module to the set of storage devices includes:
  writing the host data to a particular logical unit number mapped across the physical disk drive devices, the particular logical unit number corresponding to the data encryption key used to encrypt the data.

15. A method as in claim 12 wherein the set of storage devices include physical disk drive devices; wherein key table entries of the key table contain data encryption keys corresponding to hypervolumes mapped to portions of the physical disk drive devices; and wherein writing the encrypted host data from the I/O module to the set of storage devices includes:
  writing the host data to a particular hypervolume mapped to a portion of a particular physical disk drive device, the particular hypervolume corresponding to the data encryption key used to encrypt the data.

16. A method as in claim 10, further comprising:
- running a data storage application on the storage processor device, the data storage application being arranged to carry out data storage operations on behalf of a set of host devices; and
- running a dedicated key client on the storage processor device, the dedicated key client operating as an interface between the data storage application and a key server which is arranged to provide portions of key table entries which form the key table.

17. A method as in claim 16 wherein running the data storage application on the storage processor device includes:
- managing key table entries forming the key table, the key table entries containing data encryption keys in encrypted form.

18. A method as in claim 17 wherein the key table entries have unique key identifier handles; and wherein managing key table entries includes:
- accessing the key table entries based on requests from the electronic encryption endpoint device, the requests identifying the key table entries using the unique key identifier handles.

19. A method as in claim 17 wherein the key table entries further contain integrity checking metadata in encrypted form; and wherein applying the key encryption key to the portion of the key table entry to obtain the data encryption key in non-encrypted form within the electronic encryption endpoint device includes:
- decrypting integrity checking metadata from the portion of the key table entry and confirming integrity of the device encryption key obtained from the portion of the key table entry based on the decrypted integrity checking metadata.

20. A method as in claim 10 wherein the electronic encrypting endpoint device initially includes memory which stores an initial key; and wherein receiving the key encryption key includes:
- decrypting an encrypted transmission from the storage processor device to the electronic encrypting endpoint device using the initial key to obtain the key encryption key; and
- replacing the initial key in the memory with the key encryption key.

21. A method as in claim 20 wherein the memory includes persistent storage; and wherein replacing the initial key in the memory includes:
- overwriting the initial key with the key encryption key in the persistent storage.

22. A method as in claim 10, further comprising:
- managing the key table within the storage processor device, the key table including (i) the key table entry containing the data encryption key which is initially encrypted within the key table entry prior to decrypting the key table entry, the data encryption key being encrypted within the key table entry by the key encryption key, and (ii) another key table entry containing the data encryption key which is initially encrypted within the key table entry prior to decrypting the key table entry, the data encryption key being encrypted within the other key table entry by another key encryption key which is different than the key encryption key.

23. A method as in claim 22 wherein the electronic encryption endpoint device locally stores the key encryption key; wherein the other electronic encryption endpoint device locally stores the other key encryption key; and wherein the method further comprises:
- at the other electronic encryption endpoint device, decrypting a portion of the other key table entry using the other key encryption key to obtain the data encryption key.

24. A method as in claim 9, further comprising:
- applying a Redundant Array of Inexpensive Disks (RAID) level scheme to an initial portion of data to generate multiple RAID portions of the data; and
wherein encrypting the data using the data encryption key and storing the encrypted data in the set of storage devices includes:
- after applying the RAID level scheme, encrypting a RAID portion of the data and writing the encrypted RAID portion of the data to the set of storage devices.

25. A method as in claim 9 wherein, prior to decrypting the portion of the key table entry at the electronic encryption endpoint device, circuitry which is external to the electronic encryption endpoint device stores the key table entry in the key table during an operation which is performed out-of-band with respect to the electronic encryption endpoint device.

* * * * *